(12) United States Patent  
Suzuki et al.

(10) Patent No.: US 6,867,890 B2  
(45) Date of Patent: *Mar. 15, 2005

(54) METHOD AND APPARATUS FOR OPTICAL SCANNING CAPABLE OF REDUCING A DOT POSITION DISPLACEMENT AND A DOT DIAMETER VARIATION

(75) Inventors: Seizo Suzuki, Kanagawa-ken (JP); Junichi Yazawa, Tokyo (JP); Yoshinori Hayashi, Kanagawa-ken (JP); Masahiro Soeda, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/797,122

(22) Filed: Mar. 11, 2004

(65) Prior Publication Data

US 2004/0174580 A1 Sep. 9, 2004

Related U.S. Application Data

(63) Continuation of application No. 10/278,916, filed on Oct. 24, 2002, now Pat. No. 6,788,444.

(30) Foreign Application Priority Data

Oct. 24, 2001 (JP) ..................................... 2001-326226

(51) Int. Cl.⁷ .............................................. G02B 26/08  
(52) U.S. Cl. ........................ 359/196; 359/205; 347/260  
(58) Field of Search ............................... 359/196–226; 347/225, 250–261; 358/474

(56) References Cited

U.S. PATENT DOCUMENTS 6,166,842 A * 12/2000 Aoki et al. ................. 359/205

* cited by examiner

*Primary Examiner*—James Phan  
(74) *Attorney, Agent, or Firm*—Oblon, Spivak, McClelland, Maier & Neustadt, P.C.

(57) ABSTRACT

An optical scanning apparatus including a pulse modulation mechanism, a laser light source, a light deflecting mechanism, and a scan-imaging device. The pulse modulation mechanism performs a pulse modulation to input image data to output pulse-modulated image data. The laser light source generates a laser light beam according to the pulse-modulated image data. The laser light beam has a wavelength variation smaller than 2.0 nm per one pulse of the laser light beam. The light deflecting mechanism converts the laser light beam into a scanning laser light beam. The scan-imaging device condenses the scanning laser light beam into a scanning light spot on a surface to be scanned.

4 Claims, 9 Drawing Sheets

ONE BEAM PULSE

METHOD AND APPARATUS FOR OPTICAL SCANNING CAPABLE OF REDUCING A DOT POSITION DISPLACEMENT AND A DOT DIAMETER VARIATION

This application is a continuation of U.S. application Ser. No. 10/278,916, filed Oct. 24, 2002, U.S. Pat. No. 6,788,444.

BACKGROUND OF THE INVENTION

1. Field of the Invention

The present invention relates to a method and apparatus for optical scanning, and more particularly to a method and apparatus for optical scanning capable of reducing a dot position displacement and a dot diameter variation based on a variation in wavelength of a laser beam.

2. Discussion of the Background

Background optical scanning apparatuses for use in various image forming apparatuses including laserprinters, facsimile machines, and digital copiers have a drawback in which a focal image position on an imaging surface is varied and consequently an image quality on the imaging surface or on an output recording sheet is degraded. This variation in focal image position on the imaging surface is caused when a wavelength of a laser beam generated by a laser light source is varied and a refractive index of optical devices are accordingly changed.

A technique described in Japanese Laid-Open patent publication, No. 09-021944 attempts to avoid the effects from the variations in wavelength using a dispersion nature of a glass lens to improve an accuracy of output images.

On the other hand, an optical scanning apparatus capable of simultaneous multi-beam scanning using a plurality of laser light sources has been developed in response to an increasing trend for a high speed image reproduction. In the multi-beam method, an image quality may be degraded when the multiple beams are not precisely synchronized which is caused in many cases by variations in wavelength of the laser beams.

A technique described in Japanese Lain-Open patent publication, No. 09-076562, relates to an optical scanning lens to attempt to avoid the above-mentioned problem by reducing a difference in wavelength between multiple beams below 12 nm.

Also, in recent years, a demand for a high image density in the image reproduction using an optical scanning apparatus is rapidly increased and, to implement this demand, requirements for reduction of a dot size and a dot position displacement have grown.

There is a further problem in that an image quality is degraded due to variations in wavelength of a laser beam caused by changed in temperature. That is, when the wavelength of a laser beam is changed, an optical scan-imaging device such as fθ (ef-theta) lens changes its refractive index and, as a consequence, a start position in the scanning line on an imaging surface is changed which causes a displacement of dot position.

The above-mentioned Japanese Lain-Open patent publication, No. 09-021944 proposes a glass-made scanning lens which prevents a deterioration of an image forming accuracy by a reduction of chromatic aberration of the scan-imaging device. However, it is difficult to achieve a similar effect using a plastic lens, which falls into a complex lens structure.

SUMMARY OF THE INVENTION

In view of the foregoing, it is an object of the present invention to provide a novel optical scanning apparatus which reduces a displacement of dot position and variations in dot diameter to output a superior quality image.

Another object of the present invention is to provide a novel optical scanning method which reduces a displacement of dot position and variations in dot diameter to output a superior quality image.

To achieve these and other objects, in one example, the present invention provides a novel optical scanning apparatus including a pulse modulation mechanism, a laser light source, a light deflecting mechanism, and a scan-imaging device. The pulse modulation mechanism is configured to perform a pulse modulation with respect to input image data to output pulse-modulated image data. The laser light source is configured to generate a laser light beam in accordance with the pulse-modulated image data output by the pulse modulation mechanism. The laser light beam has a wavelength variation smaller than 2.0 nm per one pulse of the laser light beam. The light deflecting mechanism is configured to deflect the laser light beam generated by the laser light source to convert the laser light beam into a scanning laser light beam. The scan-imaging device is configured to condense the scanning laser light beam into a scanning light spot on a surface to be scanned.

Another novel optical scanning apparatus to achieve the above-mentioned object, in one example, includes a pulse modulation mechanism, a laser light source, a light detecting mechanism, and a scan-imaging device. The pulse modulation mechanism is configured to perform a pulse modulation with respect to input image data to output pulse-modulated image data. The laser light source is configured to generate a laser light beam in accordance with the pulse-modulated image data output by the pulse modulation mechanism. The laser light beam has a wavelength variation greater than 0.5 nm per one pulse of the laser light beam. The light deflecting mechanism is configured to deflect the laser light beam generated by the laser light source to convert the laser light beam into a scanning laser light beam. The scan-imaging device is configured to condensing the scanning laser light beam into a scanning light spot on a surface to be scanned. In this structure, the pulse-modulated image data applied to the laser light source from the pulse modulation mechanism is controlled so that a displacement of dot position and variation in dot diameter caused by the wavelength variations are corrected. The present invention also provides novel optical scanning methods.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1A:
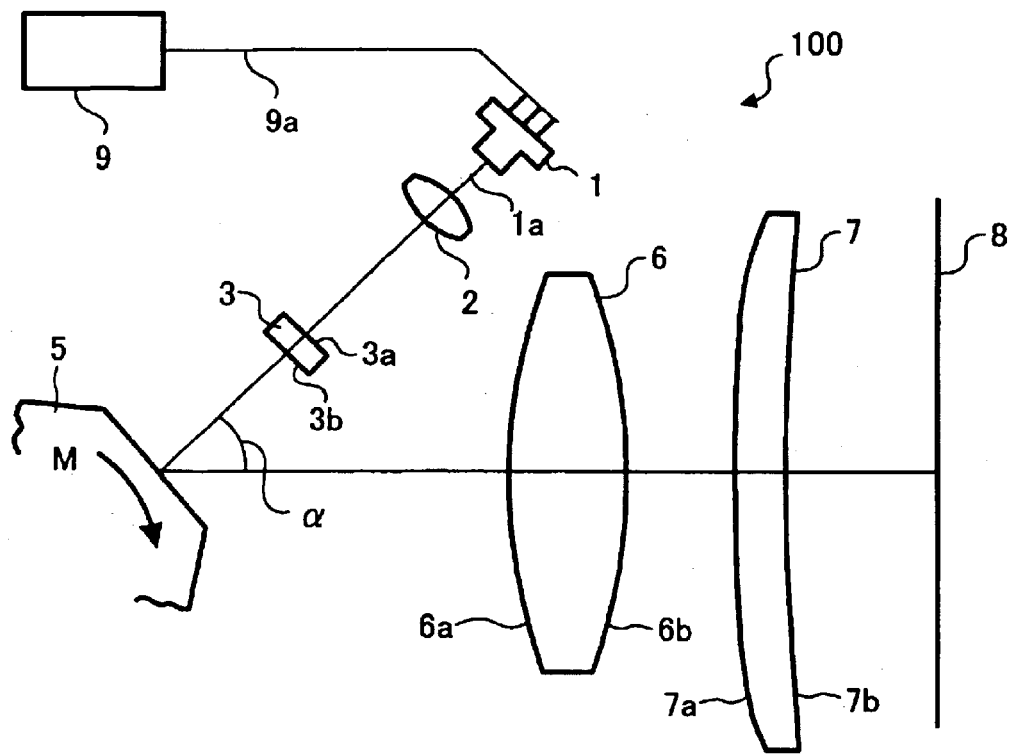
FIG. 1A is an optical scanning system according to a preferred embodiment of the present invention, seen in a direction corresponding to a main scanning direction.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Figure 1B:
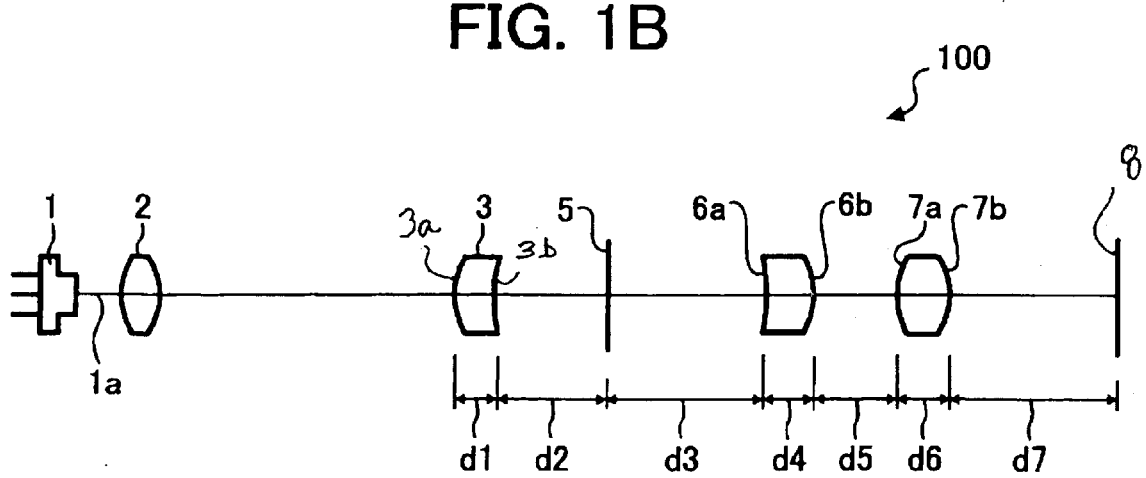
FIG. 1B is the optical scanning system of FIG. 1A, seen in a direction corresponding to a sub-scanning direction.

Referring now to the drawings, wherein like reference numerals designate identical or corresponding parts throughout the several views, particularly to FIGS. 1A and 1B, an optical scanning system 100 according to a preferred embodiment of the present invention is explained. As shown in FIG. 1A, the optical scanning system 100 includes a light source 1, a coupling lens 2, a cylinder lens 3, a rotary polygon mirror 5, a first scan-imaging device 6, a second scan-imaging device 7, an imaging surface 8, and a pulse modulation unit 9.

The cylinder lens 3 has a first surface 3a and a second surface 3b. Also, the first scan-imaging device 6 has first and second surfaces 6a and 6b, and the second scan-imaging device 7 has first and second surfaces 7a and 7b. An angle between an entry laser beam 1a to the rotary polygon mirror 5 from the light source 1 and a light axis from the rotary polygon mirror 5 to the imaging surface 8 is represented by a letter α.

FIG. 1A is a view of the optical scanning system 100 in a direction corresponding to a main scanning direction and FIG. 1B is a view in a sub-scanning direction. As shown in FIG. 1B, the distance for the laser beam to travel from the first surface 3a of the cylinder lens 3 to the imaging surface 8, which determines the optical properties of this optical scanning system 100, are split into d1–d7. That is, a distance between the first and second surfaces 3a and 3b of the cylinder lens 3 is d1, a distance between the second surface 3b of the cylinder lens 3 and the surface of the rotary polygon mirror 5 is d2, and a distance between the surface of the rotary polygon mirror 5 and the first surface 6a of the first scan-imaging device 6 is d3. Further, a distance between the first and second surfaces 6a and 6b of the first scan-imaging device 6 is d4, a distance between the second surface 6b of the first scan-imaging device 6 and the first surface 7a of the second scan-imaging device 7 is d5, a distance between the first and second surfaces 7a and 7b of the second scan-imaging device 7 is d6, and a distance between the second surface 7b of the second scan-imaging device 7 and the imaging surface 8 is d7. The distances d1, d4, and d6 actually are the thicknesses of the cylinder lens 3, and the first and second scan-imaging lenses 6 and 7, respectively.

In the optical scanning system 100 of FIG. 1A, a light ray emitted from the light source 1 is subjected to a coupling to become a desired state of a light ray by the coupling lens 2. In this example, the light ray is coupled into an approximate parallel light ray by the coupling lens 2. The light source 1 may be a semiconductor laser (LD), e.g., a laser diode, a semiconductor laser array (LDA) having a plurality of light emitting points, a multiple-beam light source generating multiple laser light beams using a plurality of LDs and prisms, for example, and so forth. By using more than one light source, an optical scanning system can achieve high speed scanning and imaging operation while reducing a rotation number of a light deflecting device (e.g., the rotary polygon mirror 5). This may increase the life of the light deflecting device and reduce electric consumption.

In the optical scanning system 100, the laser beam passing through the coupling lens 2 passes through the cylinder lens 3 and enters a deflective reflection surface of the rotary polygon mirror 5 which deflects the laser beam by reflection, as shown in FIG. 1A. When the rotary polygon mirror 5 is rotated in a direction M, the deflective reflection surface of the rotary polygon mirror 5 sequentially changes its angle relative to the laser beam and the deflection angle of the laser beam is sequentially changed. Thus, the laser beam is deflected and is consequently brought to scan an area in a predetermined range of angle.

After being deflected, the laser beam travels in a straight line to pass through the first and second scan-imaging devices 6 and 7 and arrives at the imaging surface 8. Each of the first and second scan-imaging devices 6 and 7 includes an imaging device made of resin, for example. The first and second scan-imaging devices 6 and 7 correct optical characteristics of an image to be formed on the imaging surface 8 by the scanning laser beam, including bends of the image in main scanning and sub-scanning directions, respectively and an fθ (ef-theta) characteristic, for example.

The laser beam passing through the first and second scan-imaging devices 6 and 7 forms a light spot on the imaging surface 8 and sequentially moves in the main scanning direction as the deflective reflection surface of the rotary polygon mirror 5 is moved by the rotation of the rotary polygon mirror 5. Image data which is converted into pulse-modulated image data by the pulse-modulation mechanism 9 is applied to the light source 1 through an electrical cable 9a, and the laser beam is turned on and off according to the input pulse-modulated data while scanning the imaging surface 8. Thereby, an image according to the image data is written on the imaging surface 8.

A formula X(Y,Z) expressing a geometry within an effective scanning limit achieved by the optical scanning system 100 shown in FIG. 1 is as follows;

$$X(Y, Z) = \frac{C_m \cdot Y^2}{1 + \sqrt{1 - (1+K)C_m^2 \cdot Y^2}} + \sum_{n=1}^{p} a_h \cdot Y^n +$$

-continued $$\frac{C_S(Y) \cdot Z^2}{1 + \sqrt{1 - (1 + K_Z(Y)C_S^2(Y) \cdot Z^2}} + \sum_{j=1}^{r} \left( \sum_{h=0}^{q} d_{jh} \cdot Y^h \right) \cdot Z^j.$$

In this formula X(Y,Z), the first and second terms specify a geometry at a main scanning cross-section, and express a depth in the light axis direction, where $C_m$ represents a paraxial curvature at a light axis in the main scanning surface, K represents a circular cone constant, and high coefficients ah are defined as $a_1$, $a_2$, $a_3$, $a_4$, and so on. The third and fourth terms specify a geometry at a sub-scanning cross-section, and express a depth in the light axis direction, where $C_s(Y)$ represents a paraxial curvature at Y in the sub-scanning surface, $K_z(Y)$ represents a circular cone constant, and high coefficients are defined as $d_{jh}$.

Here, Y represents a direction corresponding to the main scanning direction, Z represents a direction corresponding to the sub-scanning direction, $C_m$ or $1/R_m$ represents a paraxial curvature around a light axis in the main scanning corresponding direction, $C_s(0)$ or $1/R_s(0)$ represents a paraxial curvature around a light axis in the sub-scanning corresponding direction, $C_s(Y)$ represents a paraxial curvature in the sub-scanning corresponding direction at a position Y in the main scanning corresponding direction, and $K_z(Y)$ represents a circular cone constant expressing a quadratic curve in the sub-scanning corresponding direction at a position Y in the main scanning corresponding direction. Further, $f_{SAG}(Y,Z)$ which is equal to the forth term of the formula X(Y,Z) represents a high-order correction amount of an aspheric surface, and $C_s(Y)$ and $K_z(Y)$ are expressed as follows;

$$C_s(Y)=1/R_s(0)+B_1 \cdot Y+B_2 \cdot Y^2+B_3 \cdot Y^3+B_4 \cdot Y^4+B_5 \cdot Y^5+ \ldots,$$

and $$K_z(Y)=C_0+C_1 \cdot Y+C_2 \cdot Y^2+C_3 \cdot Y^3+C_4 \cdot Y^4+C_5 \cdot Y^5+ \ldots, \text{ respectively.}$$

The above-described components included in the optical scanning system 100 may be provided with the following specific profiles. The light source 1 has a wavelength of 780 nm. The coupling lens 2 has a focal distance of 27 mm and performs collimation as a coupling operation. The rotary polygon mirror 5 includes five deflective reflection surfaces and has an inscribed circle having a radius of 18 mm. The angle α, formed by the laser beam from the light source 1 with the light axis of the optical scanning system, is 60 degrees. An effective recording width is ±161.5 mm. An angle of field is ±40.6 mm.

Further, the curvature radius of the first surface 3a of the cylinder lens 3 is infinite in the main scanning direction and 23.69 mm in the sub-scanning direction. The second surface 3b of the cylinder lens 3 is flat. The cylinder lens 3 has a refractive index of 1.733278 at a wavelength of 655 nm and a temperature of 25° C. The distances d1–d7 are set to 7 mm, 43.608 mm, 70.662 mm, 30 mm, 66.622 mm, 8.5 mm, and 161.216 mm, respectively. Both scan-imaging devices 6 and 7 have a refractive index of 1.527238 at a wavelength of 780 nm.

The first surface 6a of the first scan-imaging device 6 has an exemplary shape defined by the factors and coefficients of:

$R_m=-1030.233346$;
$R_s(0)=-89.518927$;
$K=-4.041619 \times 10^2$;
$a_4=6.005017 \times 10^{-8}$;
$a_6=-7.538155 \times 10^{-13}$;
$a_8=-4.036824 \times 10^{-16}$;
$a_{10}=4.592164 \times 10^{-20}$;
$a_{12}=-2.396524 \times 10^{-24}$;
$B_1=-9.317851 \times 10^{-06}$;
$B_2=3.269905 \times 10^{-06}$;
$B_3=4.132497 \times 10^{-09}$;
$B_4=-4.207716 \times 10^{-10}$;
$B_5=-1.170114 \times 10^{-12}$;
$B_6=4.370640 \times 10^{-14}$;
$B_7=2.347965 \times 10^{-16}$;
$B_8=-6.212795 \times 10^{-18}$;
$B_9=-3.967994 \times 10^{-20}$;
$B_{10}=-3.873869 \times 10^{-21}$;
$B_{11}=3.816823 \times 10^{-24}$; and
$B_{12}=4.535843 \times 10^{-25}$.

The second surface 6b of the first scan-imaging device 6 has an exemplary shape defined by the factors and coefficients of:

$R_m=-109.082474$;
$R_s(0)=-110.881332$;
$K=-5.427642 \times 10^{-01}$;
$a_4=9.539024 \times 10^{-08}$;
$a_6=4.882194 \times 10^{-13}$;
$a_8=-1.198993 \times 10^{-16}$;
$a_{10}=5.029989 \times 10^{-20}$;
$a_{12}=-5.654269 \times 10^{-24}$;
$B_2=-3.652575 \times 10^{-07}$;
$B_4=2.336762 \times 10^{-11}$;
$B_6=8.426224 \times 10^{-14}$;
$B_8=-1.026127 \times 10^{-17}$;
$B_{10}=-2.202344 \times 10^{-21}$; and
$B_{12}=1.224555 \times 10^{-26}$.

The first surface 7a of the second scan-imaging device 7 has an exemplary shape defined by the factors and coefficients of:

$R_m=1493.654587$;
$R_s(0)=-70.072432$;
$K=5.479389 \times 10^{01}$;
$a_4=-7.606757 \times 10^{-09}$;
$a_6=-6.311203 \times 10^{-13}$;
$a_8=6.133813 \times 10^{-17}$;
$a_{10}=-1.482144 \times 10^{-21}$;
$a_{12}=2.429275 \times 10^{-26}$;
$B_2=-8.701573 \times 10^{-08}$;
$B_4=2.829315 \times 10^{-11}$;
$B_6=-1.930080 \times 10^{-15}$;
$B_8=2.766862 \times 10^{-20}$;
$B_{10}=2.176995 \times 10^{-24}$; and
$B_{12}=-6.107799 \times 10^{-29}$.

The second surface 7a of the second scan-imaging device 7 has an exemplary shape defined by the factors and coefficients of:

$R_m=1748.583900$;
$R_s(0)=-28.034612$;
$K=-5.488740 \times 10^2$;
$a_4=-4.978348 \times 10^{-08}$;
$a_6=2.325104 \times 10^{-12}$;

$a_8 = -7.619465 \times 10^{-17}$;
$a_{10} = 3.322730 \times 10^{-21}$;
$a_{12} = -3.571328 \times 10^{-26}$;
$a_{14} = -2.198782 \times 10^{-30}$;
$B_1 = -1.440188 \times 10^{-06}$;
$B_2 = 4.696142 \times 10^{-07}$,
$B_3 = 1.853999 \times 10^{-11}$,
$B_4 = -4.153092 \times 10^{-11}$,
$B_5 = -8.494278 \times 10^{-16}$,
$B_6 = 2.193172 \times 10^{-15}$,
$B_7 = 9.003631 \times 10^{-19}$,
$B_8 = -9.271637 \times 10^{-21}$,
$B_9 = -1.328111 \times 10^{-22}$,
$B_{10} = -1.409647 \times 10^{-24}$,
$B_{11} = 5.520183 \times 10^{-27}$,
$B_{12} = 4.513104 \times 10^{-30}$,
$C_0 = -9.999999 \times 10^{-01}$;
$d_{(4,0)} = -1.320849 \times 10^{-07}$;
$d_{(4,2)} = -1.087674 \times 10^{-11}$;
$d_{(4,4)} = -9.022577 \times 10^{-16}$;
$d_{(4,6)} = -7.344134 \times 10^{-20}$;
$d_{(6,0)} = 9.396622 \times 10^{-09}$;
$d_{(6,2)} = 1.148840 \times 10^{-12}$;
$d_{(6,4)} = 8.063518 \times 10^{-17}$; and
$d_{(6,6)} = -1.473844 \times 10^{-20}$.

With the above-described structure of the optical scanning system 100, a maximum magnification chromatic aberration $\{dH/d\lambda\}_{max}$ within the effective image region is set to 3.8 μm/nm.

Figure 2A:
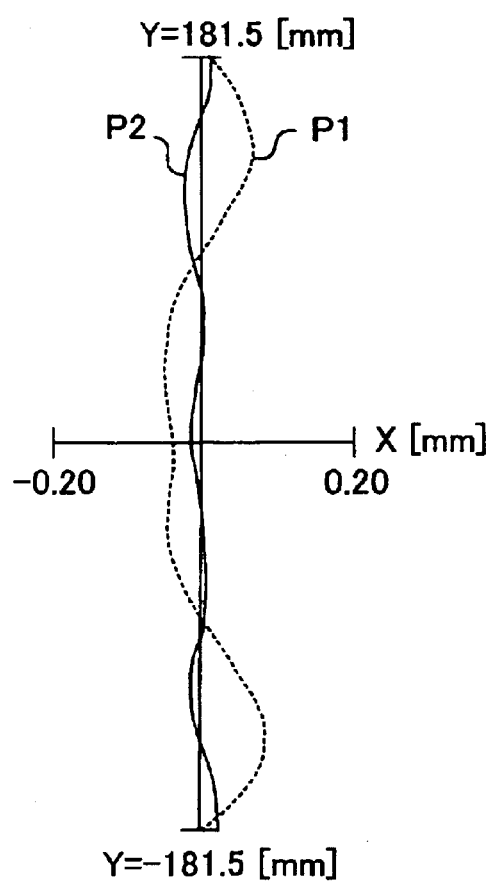
FIG. 2A is a graph showing preferable properties of bends in an imaging surface in the main scanning and sub-scanning directions with respect to the optical scanning system of FIG. 1A.
Figure 2B:
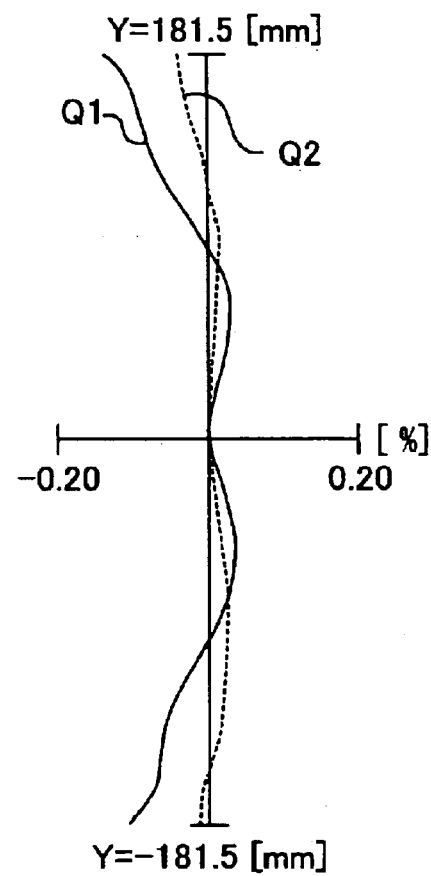
FIG. 2B is a graph showing preferable properties of linearity and fθ (ef-theta) with respect to the optical scanning system of FIG. 1A.

Turning now to FIG. 2A, which shows properties of bends in an image surface in the main scanning and sub-scanning directions of the optical scanning system 100 by letters A and B, respectively. As shown in FIG. 2A, the bends in an image surface in both the main scanning and sub-scanning directions are within a range of from −0.20 mm to 0.20 mm in a main scanning region of from −181.5 mm to 181.5 mm and are considered to be preferable. Also, FIG. 2B shows properties of linearity and fθ (ef-theta) of the optical scanning system 100 by letters C and D, respectively. As shown in FIG. 2B, the linearity and the fθ (ef-theta) are within a range of from −0.20% to 0.20% and are considered to be preferable.

Figure 3A:
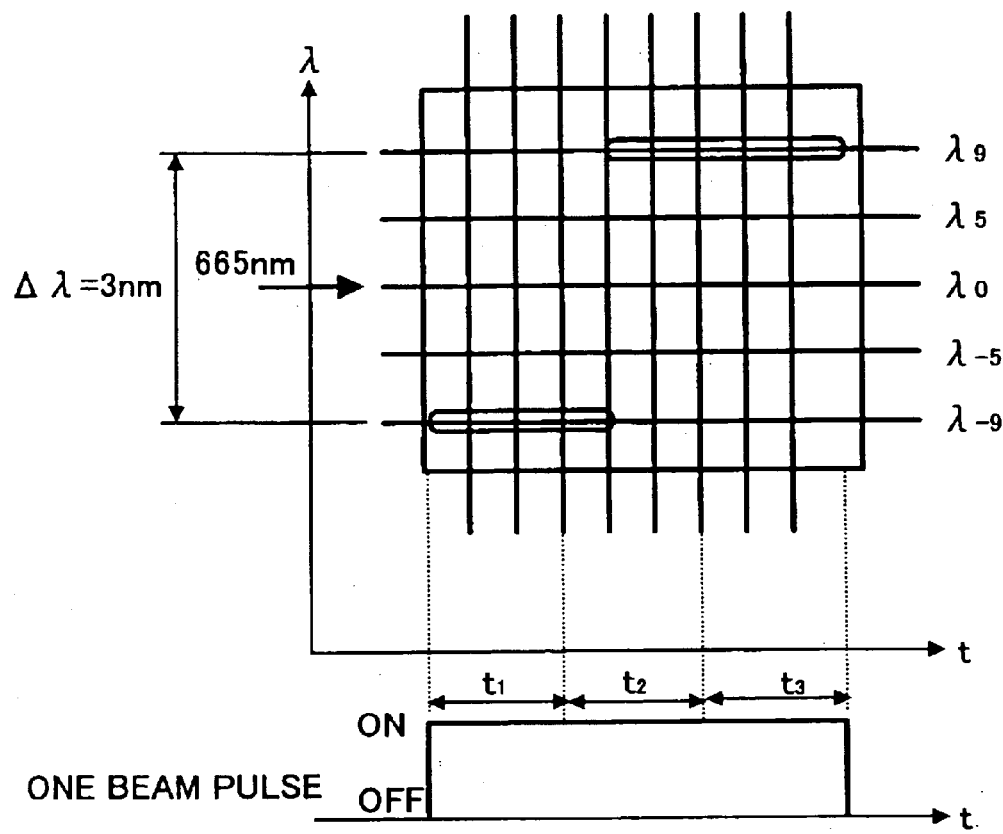
FIGS. 3A–3D are graphs for explaining a comparison of dot positions formed on the imaging surface in one beam pulse based on a relationship between a wavelength with a variation of 3 nm and a time period of one beam pulse.

With the above-structured optical scanning system 100, wavelength variations within one pulse generated by the light source 1 are preferably below 2.0 nm. An exemplary comparison is explained with reference to FIGS. 3A–3D where the wavelength variations extend to approximately 3 nm, for example. FIG. 3A demonstrates a comparison of dot positions formed on the imaging surface 8 in one beam pulse based on a relationship between a wavelength with a variation of 3 nm, for example, indicated along a vertical axis, and times t1–t3 constituting a time period of one beam pulse indicated along a horizontal axis.

Figure 3B:
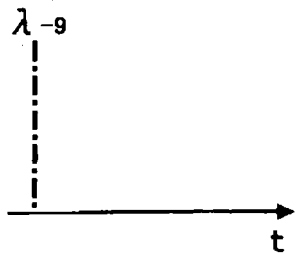
Figure 3C:
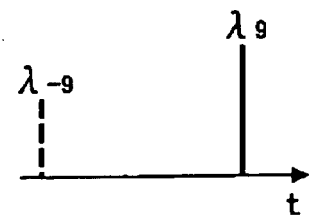
Figure 3D:
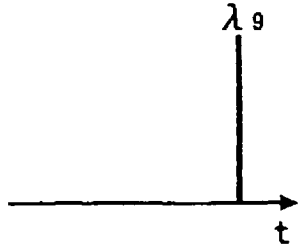
Figure 4A:
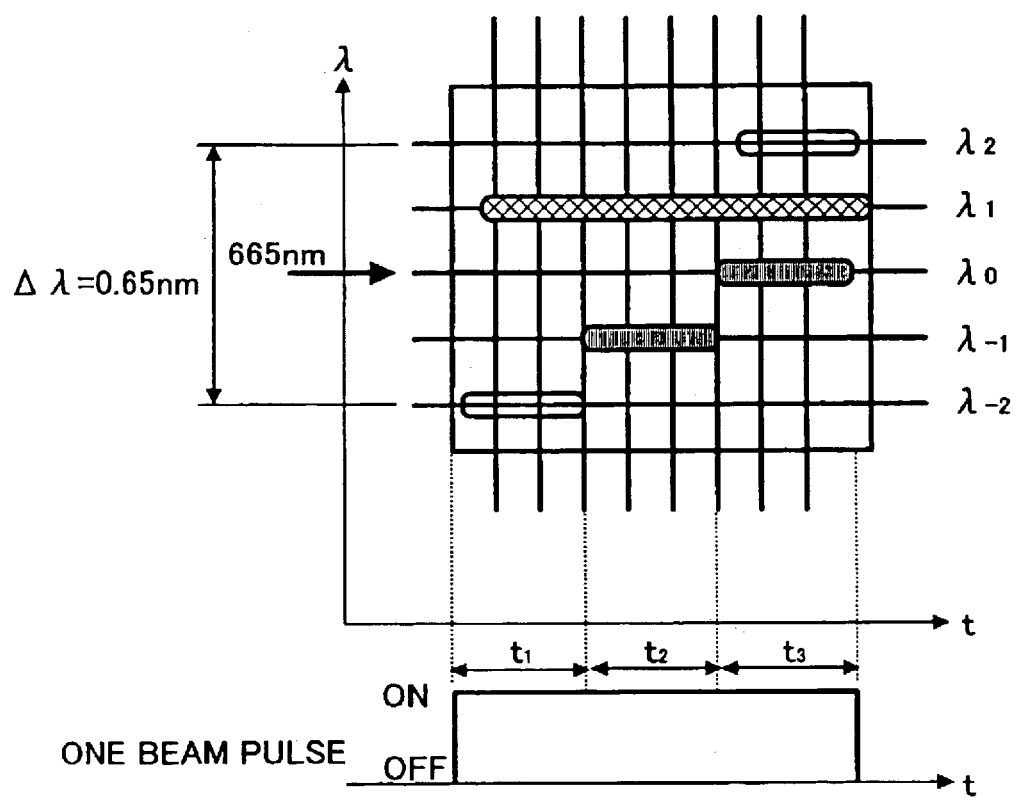
FIGS. 4A–4D are graphs for explaining dot positions formed on the imaging surface also in one beam pulse but when the wavelength variation is set to 0.65 nm.
Figure 4B:
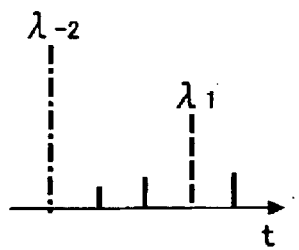
Figure 4C:
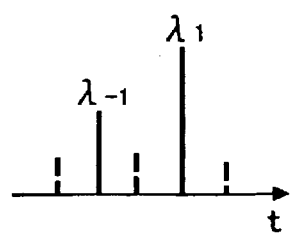
Figure 4D:
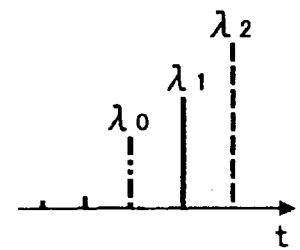
Figure 5A:
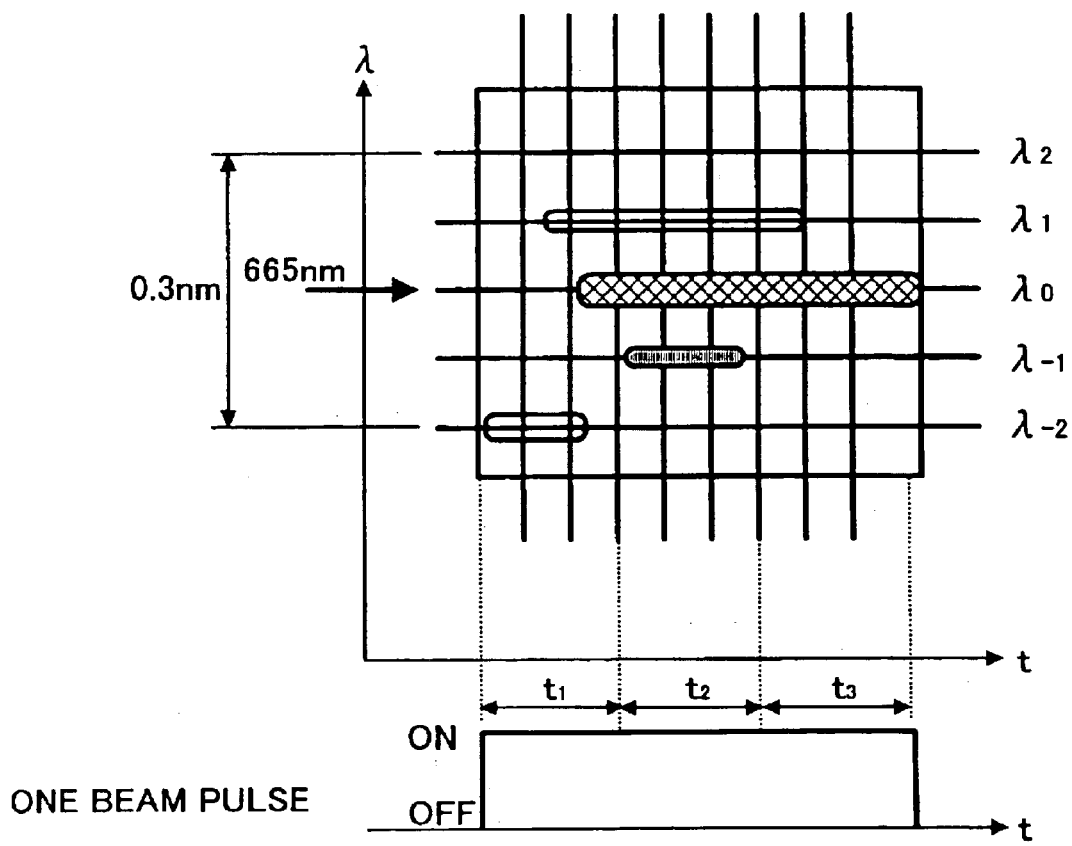
FIGS. 5A–5D are graphs for explaining dot positions formed on the imaging surface also in one beam pulse but when the wavelength variation is set to 0.3 nm.
Figure 5B:
Figure 5C:
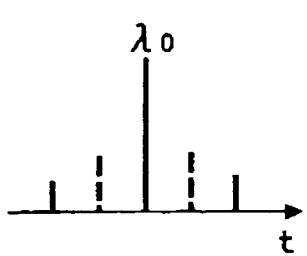
Figure 5D:
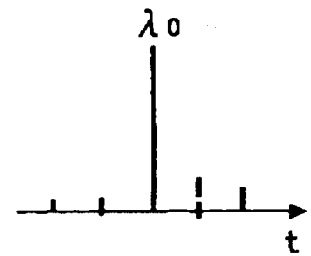

A central wavelength $\lambda_0$ is set to 665 nm. FIGS. 3B–3D show spectra in the times t1–t3, respectively. In this comparison, dot positions are largely displaced in a focal image height on the imaging surface 8. As a result of the displacement of the dot positions, a jitter may occur particularly in an image of a vertical line and an image may lose granularity. In a color image, the displacement of the dot positions may cause displacements of colors. In addition, since a dot diameter is also varied in the focal image height (see FIG. 6), an output image may have an uneven density.

However, when the wavelength variations within one pulse generated by the light source 1 are set to values below 2.0 nm, the displacement of dots and the variations of dot diameter are reduced and accordingly a preferable image output can be obtained. One exemplary case is shown in FIGS. 4A–4D where the wavelength variations are limited to approximately 0.65 nm, for example. Another exemplary case is shown in FIGS. 5A–5D where the wavelength variations are limited to approximately 0.3 nm, for example.

Figure 6:
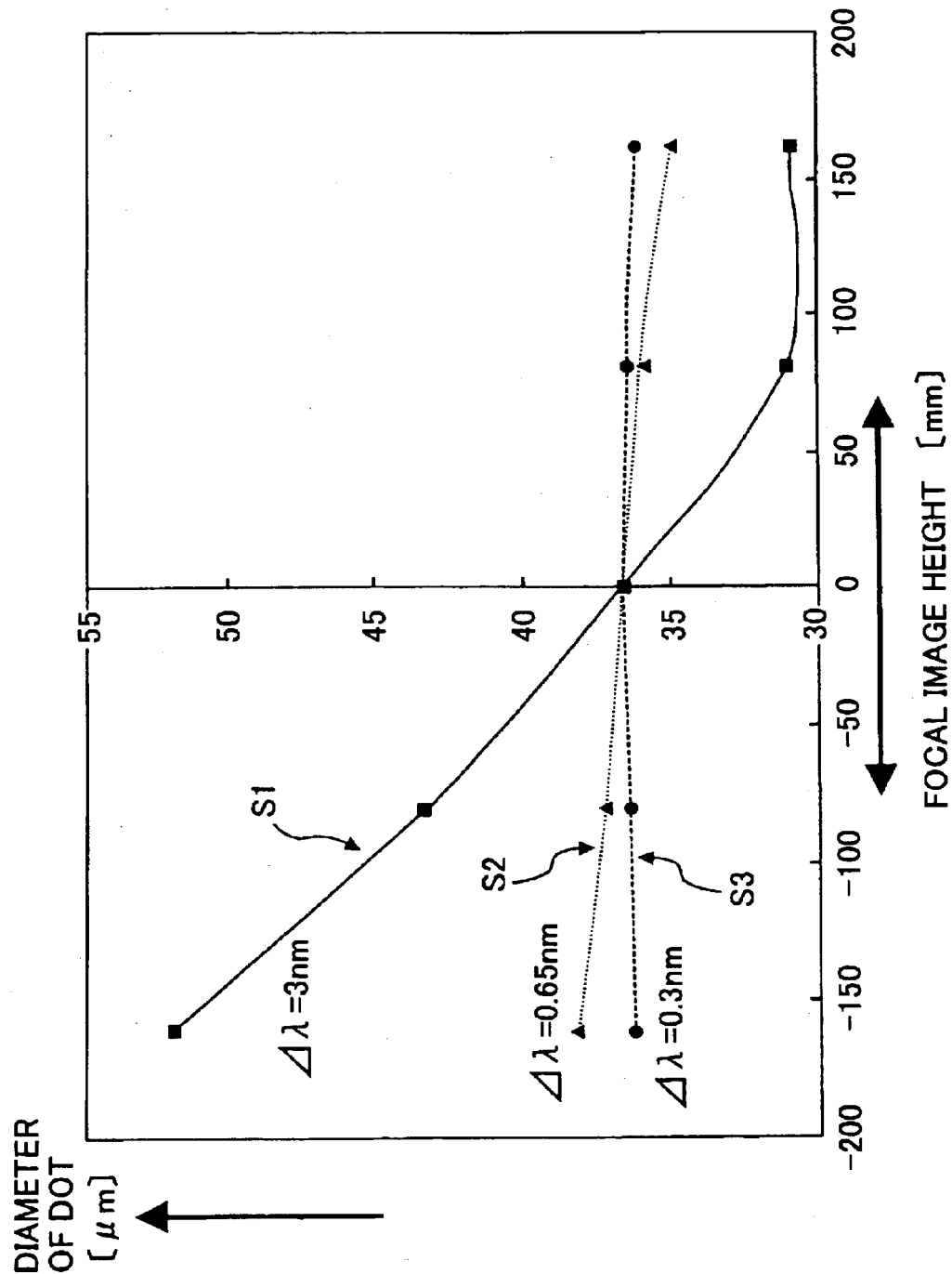
FIG. 6 is a graph showing a relationship between a dot diameter and a focal image height on the imaging surface with a parameter of the wavelength variations of 3 nm, 0.65 nm, and 0.3 nm.

A relationship between the dot diameter and the focal image height on the imaging surface 8 is shown in a graph of FIG. 6, with a parameter of the above-described three wavelength variations. Curves S1–S3 in the graph of FIG. 6 represent the relationship at wavelength variations of, for example, 3 nm, 0.65 nm, and 0.3 nm, respectively. The curve S1 is a comparison curve and the curves S2 and S3 are according to preferred embodiments of the present invention. As is clear, the variation in dot diameter at a wavelength variation of 3 nm is the greatest among the three examples and the variation at a wavelength variation of 0.3 nm is the smallest.

The pulse-modulation mechanism (not shown), which converts image data into pulse-modulated data and applies the pulse-modulated data to the light source 1, may control the pulse width of the pulse-modulated data in accordance with the wavelength variations with respect to the laser beam. As shown in the comparison curve S1 in the graph of FIG. 6, when the wavelength of the laser beam is changed, the dot diameter on the imaging surface 8 is accordingly changed to an extent different for each focal image height. Therefore, the variations in dot diameter are corrected by changing the pulse width in accordance with the focal image height on the imaging surface 8 so that the variations in dot diameter are reduced. Thus, the variations of dot diameter can theoretically be reduced to 0.

Figure 7:
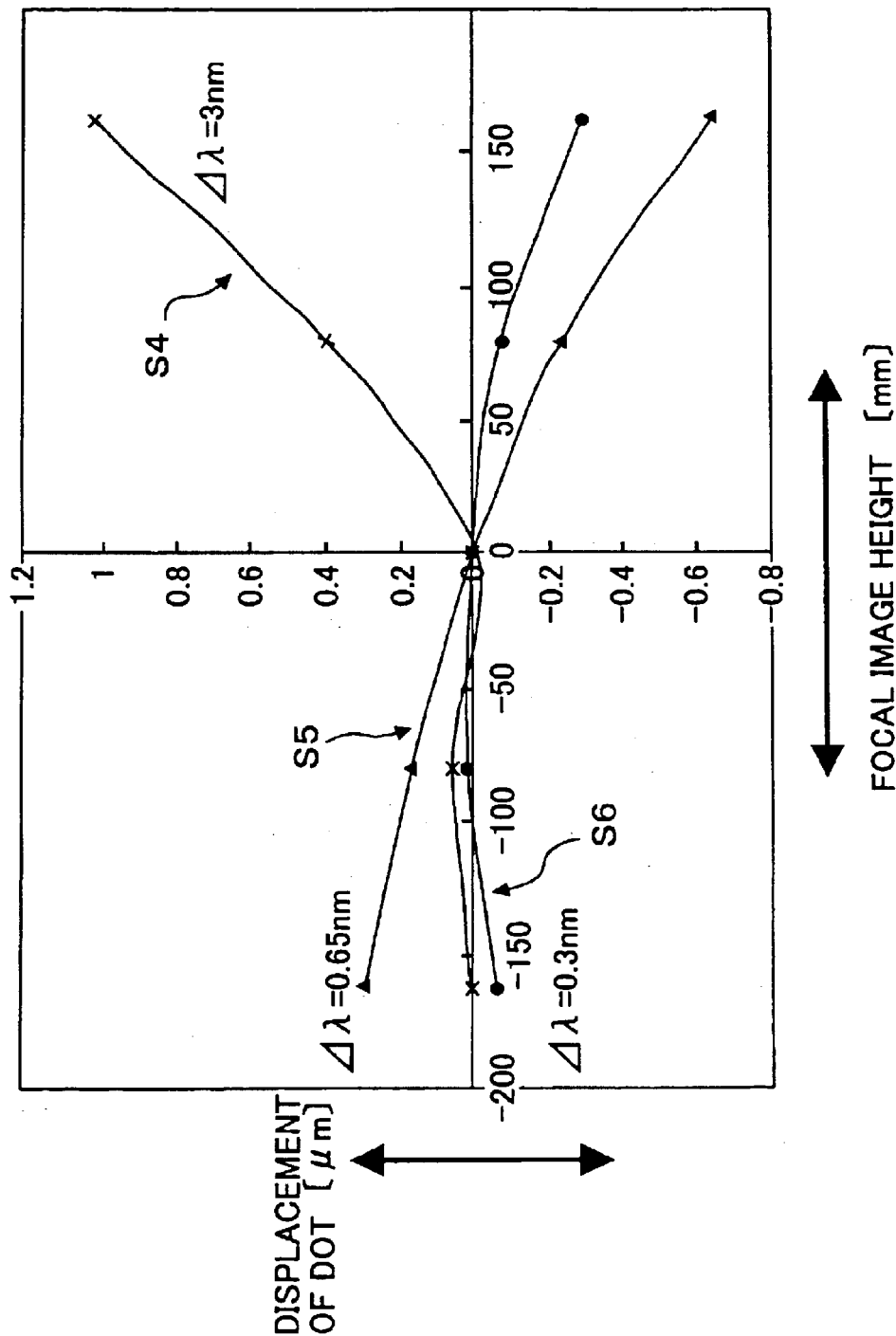
FIG. 7 is a graph showing a relationship between a dot position displacement and a focal image height on the imaging surface with a parameter of the wavelength variations of 3 nm, 0.65 nm, and 0.3 nm.

Also, a relationship between the dot displacement and the focal image height on the imaging surface 8 is shown in a graph of FIG. 7, with a parameter of the above-described three wavelength variations. Curves S4–S6 in the graph of FIG. 6 represent the relationship at wavelength variations of, for example, 3 nm, 0.65 nm, and 0.3 nm, respectively. The curve S4 is a comparison curve and the curves S5 and S6 are according to preferred embodiments of the present invention. As is clear, the variation in dot displacement at a wavelength variation of 3 nm is the greatest among the three examples and the variation at a wavelength variation of 0.3 nm is the smallest.

The pulse-modulation mechanism (not shown), which converts image data into pulse-modulated data and applies the pulse-modulated data to the light source 1, may control a start of the pulse of the pulse-modulated data in accordance with the wavelength variations with respect to the laser beam. As shown in the comparison curve S4 in the graph of FIG. 7, when the wavelength of the laser beam is changed, the dot position on the imaging surface 8 is accordingly changed to an extent different for each focal image height. Therefore, the variations in dot position are corrected by changing the pulse width in accordance with the focal image height on the imaging surface 8 so that the variations in dot position are reduced. Thus, the variations of dot position can theoretically be reduced to 0.

Accordingly, it is understood from the graphs of FIGS. 6 and 7 that the optical scanning system 100 can produce a desirable image output with relatively great reductions of variations in dot diameter and displacement of dot position when the wavelength variations of the light source 1 are reduced to 0.65 nm and 0.3 nm, for example. Moreover, the variation in dot diameter can effectively be reduced to a non-problematic level by setting the wavelength variation in a time period on one beam pulse below 2 nm.

According to the preferred embodiment of the present invention, the first and second scan-imaging devices 6 and 7 need to satisfy the following condition:

$$|\Delta\lambda \times dH/d\lambda| < 5 \; \mu m,$$

where $\Delta\lambda$ represents the wavelength variations in a time period of one pulse width of the laser light beam generated by the light source 1 and $dH/d\lambda$ represents the magnification chromatic aberration of the scan-imaging devices (i.e., variations in focal image height per a wavelength variation of 1 nm). That is, the displacements of dot position and the variations of dot diameter can effectively be reduced by determining the wavelength variations per one pulse of the laser light beam and the magnification chromatic aberration of the first and second scan-imaging devices 6 and 7 to respective optimum values. When the dot position displacement is 5 $\mu m$ or smaller, for example, it can hardly be recognized by human eyes. The first and second scan-imaging devices 6 and 7 of the optical scanning system 100 satisfy the above-mentioned condition. That is, when the wavelength variation is 0.65 nm, $$|\Delta\lambda \times dH/d\lambda| = (0.65 \; nm) \times (3.8 \; \mu m/nm) = 2.5 \; \mu m,$$

and when the wavelength variation is 0.3 nm, $$|\Delta\lambda \times dH/d\lambda| = (0.30 \; nm) \times (3.8 \; \mu m/nm) = 1.1 \; \mu m.$$

Further, according to the preferred embodiment of the present invention, the first and second scan-imaging devices 6 and 7 also need to satisfy the following condition:

$$W0/Wb \times Duty < 0.8,$$

where W0 represents an image size corresponding to an image density, Wb represents a beam spot diameter of a $1/e^2$ in a direction corresponding to the main scanning direction, and Duty represents a duty ratio of one pulse of the laser light beam. The displacement of dot position and the variations in dot diameter may appear differently in accordance with the beam spot diameter and the duty ratio, which is defined as a ratio of an actual light-on time width relative to a pixel time width. Accordingly, the displacement of dot position and the variations in dot diameter become inconspicuous as the beam spot diameter increases or the duty ratio decreases. That is, with the structure satisfying the above-mentioned condition, it is possible to generate a desirable output image without producing the displacement of dot position and the variations in dot diameter at a visible level.

In the optical scanning system 100, the image size W0 and the beam spot diameter Wb in a resolution of 1200 dpi are set to 21.2 $\mu m$ (i.e., W0=25.4/1200) and 30 $\mu m$, respectively. Therefore, the above-mentioned condition is calculated as:

$$W0/Wb \times Duty = (21.2/30) \times (0.9) = 0.636,$$

where the beam spot diameter Wb is a diameter obtained by normalizing a peak intensity and setting a threshold level to a value of $1/e^2$ when a shape of a static beam spot at an arbitrary image height is expressed by a line spread function.

Figure 8A:
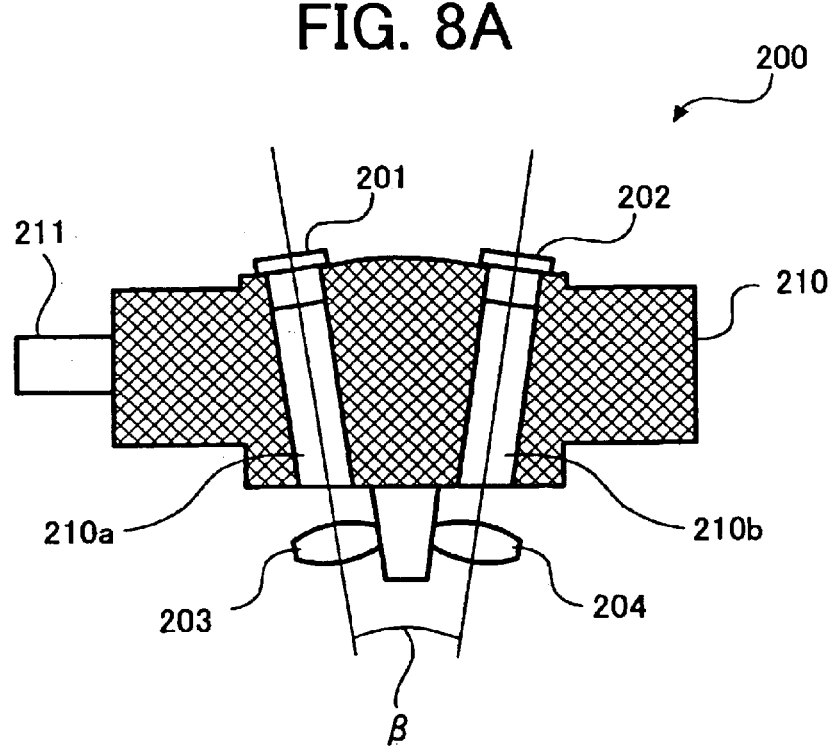
FIGS. 8A and 8B are illustrations for explaining a multi-beam light source unit according to another preferred embodiment of the present invention.
Figure 8B:
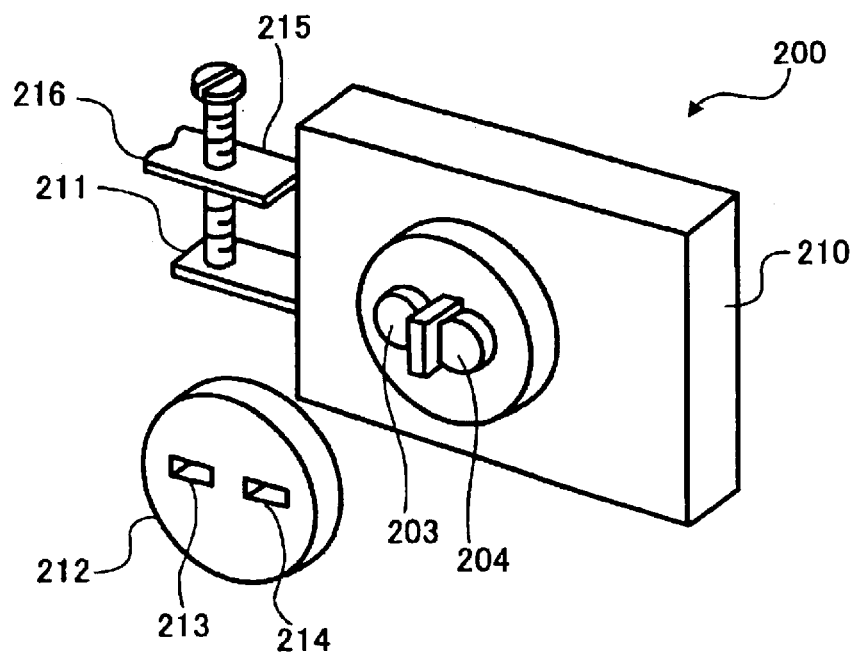
Figure 9:
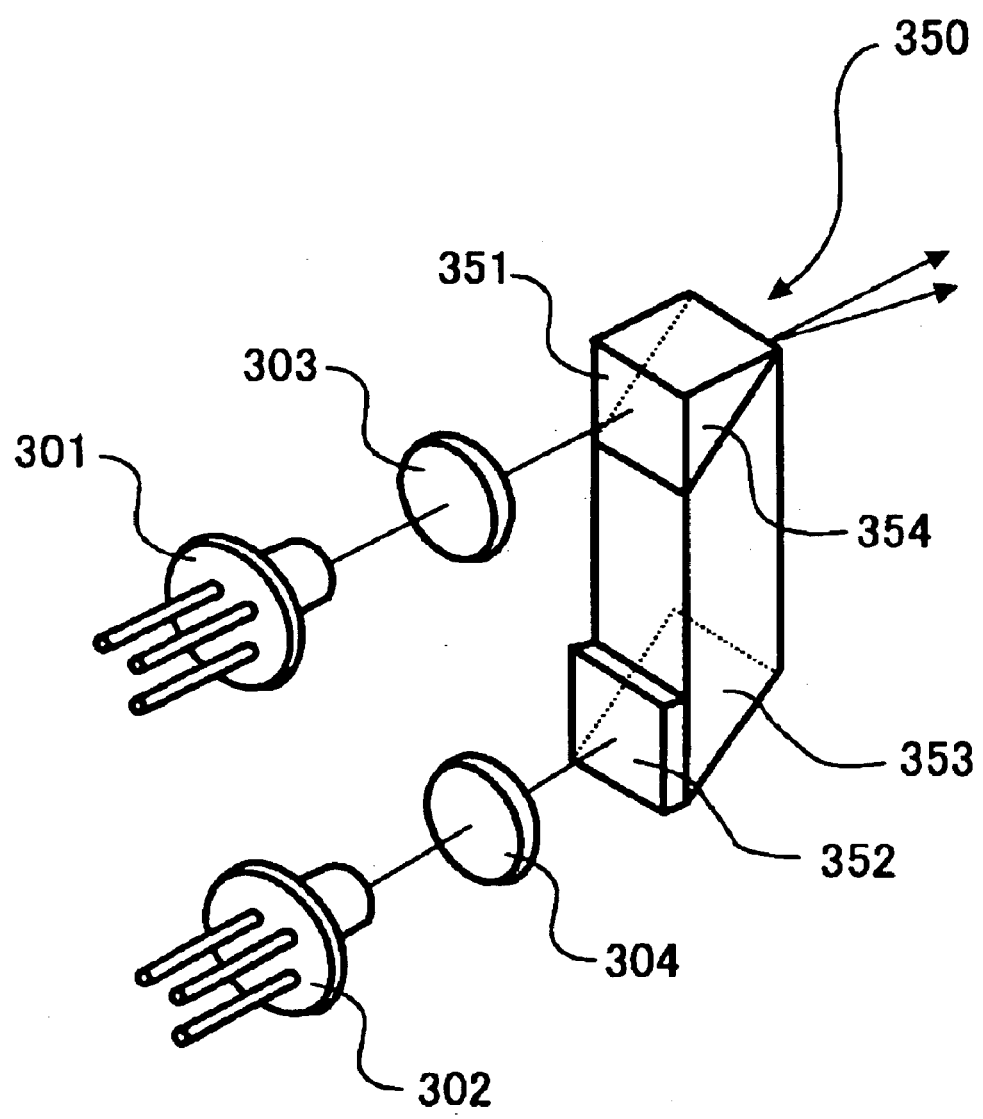
FIG. 9 is an illustration for explaining a multi-beam light source unit according to anther preferred embodiment of the present invention.

Referring now to FIGS. 8A, 8B, and 9, a case of using a multi-beam light source is explained. With a multi-beam light source, an imaging surface can be simultaneously scanned with a plurality of light beams. Thereby, a high recording density and high speed recording can be achieved with a multi-beam light source while increasing a life of a light deflection device of a rotary polygon mirror cylinder by reducing the deflection speed of the light deflection device. The multi-beam light source may preferably be a semiconductor laser array light source (e.g., a laser diode array).

In using a multi-beam light source, it is preferable to synthesize a plurality of light beams generated by the multi-beam light source. FIGS. 8A and 8B show an exemplary multi-beam light source unit 200. As shown in FIG. 8A, the multi-beam light source unit 200 includes light sources 201 and 202, coupling lenses 203 and 204, a holder 210 having holes 210a and 210b, and an adjusting plate 211. In this multi-beam light source unit 200, the holes 210a and 210b are formed such that virtual center lines of the holes 210a and 210b intersect with a predetermined angle β.

The light sources 201 and 202 are engaged into the holes 210a and 210b, respectively, and the coupling lenses 203 and 204 are mounted to the holder 10 at positions facing the light sources 201 and 202, as shown in FIG. 8A. The laser light beams generated by the light sources 201 and 202 travel towards an imaging surface (not shown) through the coupling lenses 203 and 204, and intersect at a predetermined position such as in the vicinity of a deflective reflection surface (not shown), for example. Thus, the multi-beam light source unit 200 synthesizes the laser light beams from the light sources 201 and 202.

FIG. 8B shows a perspective view of the multi-beam light source unit 200. As shown in FIG. 8B, an aperture plate 212 having apertures 213 and 214 is mounted to a frame (not shown) such that the apertures 213 and 214 face the coupling lenses 203 and 204, respectively. As also shown in FIG. 8B, a plate 215 is extended from the frame (not shown) to hold an adjusting screw 216 for adjusting a sub-scanning pitch between the laser light beams from the light sources 201 and 202.

Turning now to FIG. 9, which shows a multi-beam light source 300 using a prism 350. As shown in FIG. 9, the multi-beam light source 300 includes light sources 301 and 302, coupling lenses 303 and 304, and the prism 350. The prism 350 has light receiving surfaces 351 and 352 for receiving the laser beams traveled from the light sources 301 and 302, through the coupling lenses 303 and 304, respectively. The prism 350 also has a total reflection inner surface 353 for totally reflecting the laser light beam through the coupling lens 304 and a half mirror inner surface 354 for coupling the laser light beams from the light sources 301 and 302.

When a multi-beam light source (e.g., the above-described multi-beam light source units 200 and 300) is used, not only the displacement of dot position by each specific laser beam needs to be corrected but the displacement of dot position between the laser beams also needs to be connected. The displacement of dot position may hardly occur at the start position in the scanning line (i.e., the recording start position) by synchronizing the two laser beams.

However, when the laser beams have the center wavelengths different from each other, the displacement of dot position gradually occurs due to the magnification chromatic aberrations of the scanning lenses used and becomes apparent at the end position in the scanning line. To avoid this problem, it is preferable to determine the difference of a central wavelength between the multiple laser beams below 10 nm. By using the multi-beam light sources that generate multiple laser beams of which wavelengths have a difference below 10 nm, the displacement of dot position does not occur through the scanning line so that a superior image output can be obtained.

When the variations in wavelength in one laser beam pulse is greater than 0.5 nm and the magnification chromatic aberration of the scanning lenses is relatively large, the displacement of dot position and the variations in dot diameter are too large to be disregarded. To avoid this problem, it is preferable to control image data to be input to the laser light source so that the displacement of dot position and the variations in dot diameter are corrected.

In addition, when the laser light source generates a laser beam in a single mode, that is, a single-wave-length spectrum, variations in a wavelength causes the relatively large displacement of dot position and the variations in dot diameter both to be relatively large. To avoid this problem, it is preferable to use a laser light source configured to serve a multiple-spectra mode generating at least five spectra so that, when the variations in wavelength occur, the wavelength variations are dispersed into the spectra. Thereby, the displacement of dot position and the variations in dot diameter are reduced to non-problematic levels.

Numerous additional modifications and variations are possible in light of the above teachings. It is therefore to be understood that within the scope of the appended claims, the disclosure of this patent specification maybe practiced otherwise than as specifically described herein.

This patent specification is based on Japanese patent application, No. JPAP2001-326226 filed on Oct. 24, 2001, in the Japanese Patent Office, the entire contents of which are incorporated by reference herein.

What is claimed is:

1. An image forming apparatus having an optical scanning apparatus, said optical scanning apparatus comprising:

a pulse modulation configured to perform a pulse modulation with respect to input image data to output pulse-modulated image data;

a laser light source configured to generate a laser light beam in accordance with the pulse-modulated image data output by said pulse modulation mechanism, said laser light beam having a wavelength variation smaller than 2.0 nm per one pulse of the laser beam;

a light deflecting mechanism configured to deflect the laser light beam generated by said laser light source to convert the laser light beam into a scanning laser light beam; and a scan-imaging device configured to condense the scanning laser light beam into a scanning light spot on a surface to be scanned.

2. An image forming apparatus as claimed in claim 1, wherein said image forming apparatus is a laser printer.

3. An image forming apparatus as claimed in claim 1, wherein said image forming apparatus is a facsimile machine.

4. An image forming apparatus as claimed in claim 1, wherein said image forming apparatus is a digital copier.

* * * * *